April 8, 1969 C. J. ANDERSON ET AL 3,437,763

RECORD REJECT SYSTEM

Filed June 8, 1966 Sheet 1 of 4

INVENTORS.
CARL J. ANDERSON
EDWIN J. MEIXNER

BY

ATTY

RECORD REJECT SYSTEM

Filed June 8, 1966 Sheet 2 of 4

INVENTORS.
CARL A. ANDERSON
EDWIN J. MEIXNER

BY

INVENTORS.
CARL J. ANDERSON
EDWIN J. MEIXNER
BY

RECORD REJECT SYSTEM

Filed June 8, 1966

INVENTORS.
CARL J. ANDERSON
EDWIN J. MEIXNER
BY

United States Patent Office 3,437,763

Patented Apr. 8, 1969

3,437,763
RECORD REJECT SYSTEM

Carl J. Anderson, La Grange Park, and Edwin J. Meixner, Mount Prospect, Ill., assignors to The Seeburg Corporation, Chicago, Ill., a corporation of Delaware Filed June 8, 1966, Ser. No. 556,138
Int. Cl. G11b *3/08*
U.S. Cl. 179—100.4 9 Claims This invention relates generally to a control system for a phonograph and, more particularly, to a control system for automatically rejecting a record when the phonograph continuously repeats a certain portion of a recording.

Frequently, a phonograph needle will become confined to a single section of a record groove (commonly referred to as a single groove, but technically a nearly circular section of the single spiral groove formed on the record), and the phonograph will continuously repeat a portion of recorded sound corresponding to the section of the record groove. If an operator is continuously present, such as in a home-use phonograph, it is a relatively simple matter to remove the phonograph needle from the groove (i.e., to manually reject the record). However, if the phonograph is completely automated (as is typically the case in commercial installations), the phonograph may continue to reproduce the same portion of the record for an extended interval of time. Further, even if someone authorized to operate the phonograph is present, the phonograph is typically located in a relatively inaccessible area, and much time and effort must be expended to manually replace the record. Not only is this an undesirable condition from a listener's viewpoint, but the owner or lessee of the phonograph unit may continually lose funds as a result of a prospective customer being unable to obtain his selection. Also, the wear on the phonograph needle and phonograph circuit elements is not accompanied by an off-setting income.

This problem does not seem to have been extensively dealt with in the past, but one prior art approach is shown in U.S. Patent No. 2,921,992, issued Jan. 19, 1960 to J. D. Bick and assigned to Radio Corporation of America. In this patent a system is depicted in which the sound being reproduced from a phonograph record is simultaneously recorded on a secondary magnetic tape recorder. Reproduction of the sound on the magnetic tape recorder is delayed for a time equal to one revolution of the phonograph record, at which time the reproduced sound on the magnetic tape recorder is compared, by an appropriate circuit, with the phonograph pick-up. If the magnetic tape recorder reproduction and the phonograph pick-up sounds are identical for a minimum length of time, this condition serves as an indication that the same section of the record is being repeated, and a signal is then generated to reject the record. This arrangement is relatively complex, unwieldy, and expensive. However, the disadvantages of the Bick system are overcome by the novel record reject system of the subject invention which does not respond to normal recordings on the record, as does the Bick circuit, but only to large amplitude signals resulting from the malfunction of the phonograph.

Briefly, in the preferred embodiments described herein, the invention utilizes the fact that when a phonograph needle is confined to a single section of a phonograph record groove, the needle must pass over a wall separating that section from an adjacent section of the groove upon each revolution of the record. While this situation is the one most frequently encountered, it should be realized that the subject invention is applicable in any case where a defective operation of the phonograph causes the needle to pass over the wall of the record groove. As the needle passes over the wall of the groove, the needle is forced out of contact with the groove before it drops back into the groove on the other side of the wall of the groove. As the needle drops back into the groove, a large amplitude signal is produced in an electrical circuit connected to the needle. This large amplitude signal has a magnitude considerably greater than the magnitude of signals produced from normal sounds appearing on the record and results in a relatively loud "pop" sound at the phonograph speaker. By determining if these large amplitude signals are repeated at a time separation equal to one rotation of the record, the confining of a needle to one section of the groove may be automatically detected, and a signal may be generated to cause the record to be rejected.

To determine the occurrence of large amplitude signals at the given time separation, it is desirable to isolate these signals from the signals representing the normal recorded sound. The large amplitude signals are then further amplified and shaped by proper circuitry before the resulting pulses are passed to a timing circuit utilized to determine if two large amplitude signals occur at a time separation equal to the time of rotation of the record. In the timing circuit the pulses are transmitted to a first monostable multivibrator circuit, which produces an output pulse signal having a relatively short time duration. The output signal of the first monostable multivibrator circuit is utilized to trigger a second monostable multivibrator circuit, which produces an output pulse signal having a time duration greater than the time of rotation of the record, but which exceeds the rotation time of the record by a time interval shorter than the time duration of the output signal of the first monostable multivibrator circuit. The output signal of the second monostable multivibrator circuit is inverted and applied to a first sensing circuit (an AND gate that produces an output when both of two predetermined signals are present at its input). Also connected to the first sensing circuit is the output signal of the first monostable multivibrator circuit. If the phonograph needle is stuck in one section of the record groove, the second output signal from the first monostable multivibrator circuit (corresponding to a second large amplitude signal) and the inverted output of the second monostable multivibrator circuit have the same polarity for a short period of time and thus cause the first sensing circuit to produce an output. In one of the preferred embodiments of the subject invention, this output of the first sensing circuit energizes a switching circuit to cause the record to be rejected.

In another of the preferred embodiments, the output of the first comparator circuit is connected to a third monostable multivibrator circuit. The output of the third monostable multivibrator circuit is inverted, as in the case of the output of the second monostable multivibrator circuit, and applied to a differentiator circuit. The output of the differentiator circuit is then passed to a second sensing circuit (AND gate). Also connected to the second sensing circuit is the output signal of the first monostable multivibrator circuit. If the phonograph needle is stuck in one section of the record groove, a third large amplitude signal will cause a third output signal to be produced by the first monostable multivibrator circuit. The third output signal of the first monostable multivibrator circuit and the inverted and differentiated output of the third monostable multivibrator circuit will have the same polarity for a short period of time, thus causing the second sensing circuit to produce an output signal. This output signal of the second sensing circuit then energizes the switching circuit to cause the record to be rejected. This three count embodiment (i.e., responsive to three "pops") has the advantage of giving greater assurance that the record will not be rejected accidentially, while the two count embodiment (i.e., responsive to two "pops") has the advantage of being less expensive and more compact.

Accordingly, a primary object of the present invention is to provide a control circuit to cause a record to be automatically rejected when the same section of a record is being continuously repeated.

Another object of this invention is to provide an automatic record reject control circuit which is relatively inexpensive and non-complex.

These and other objects, advantages, and features of the subject invention will hereinafter appear and, for purposes of illustration, but not of limitation, an exemplary embodiment of the subject invention is shown in the appended drawings in which.

Figure 1A:
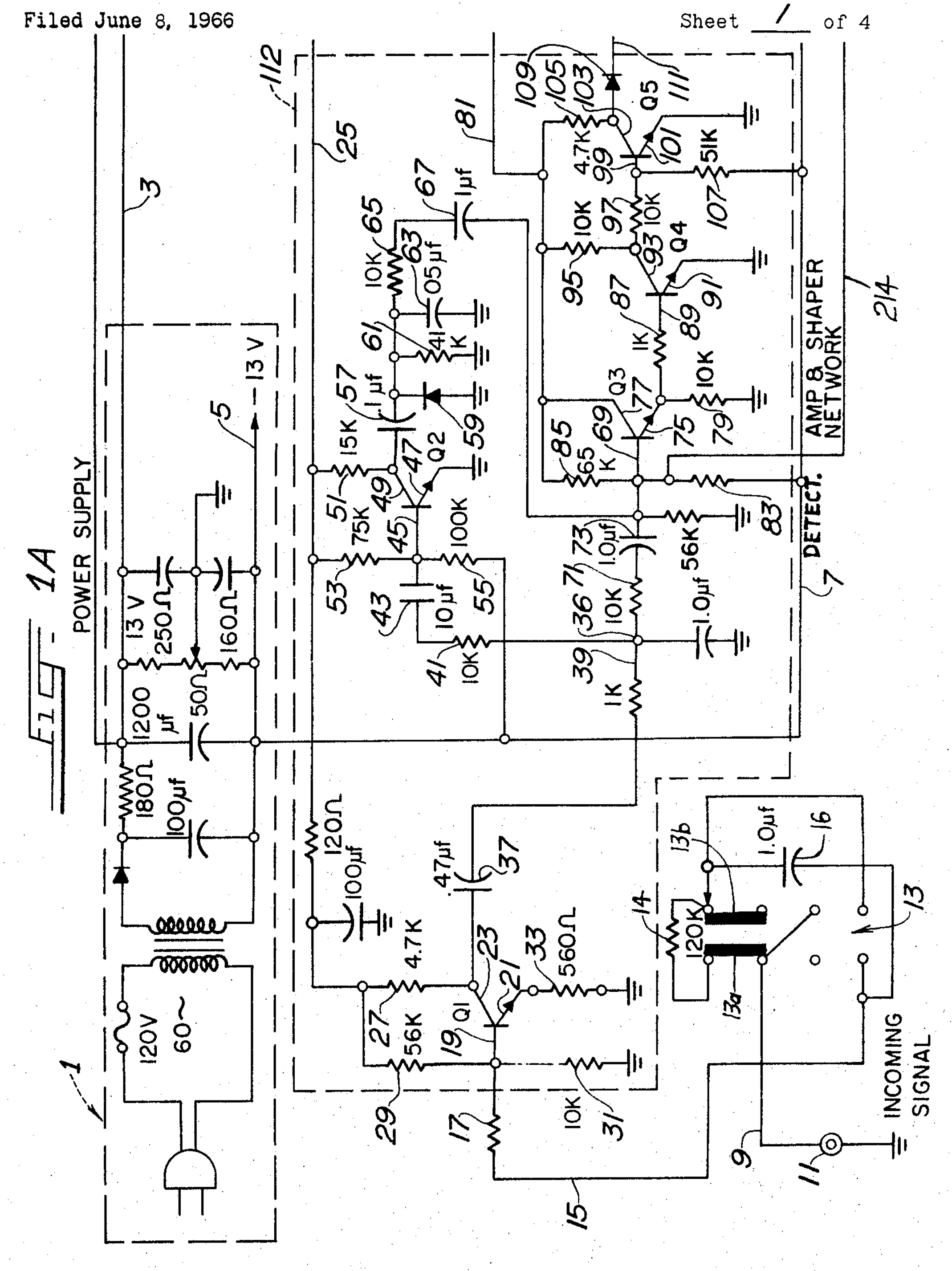
FIGURES 1A and 1B are a schematic circuit diagram of the control circuit of this invention.
Figure 1B:
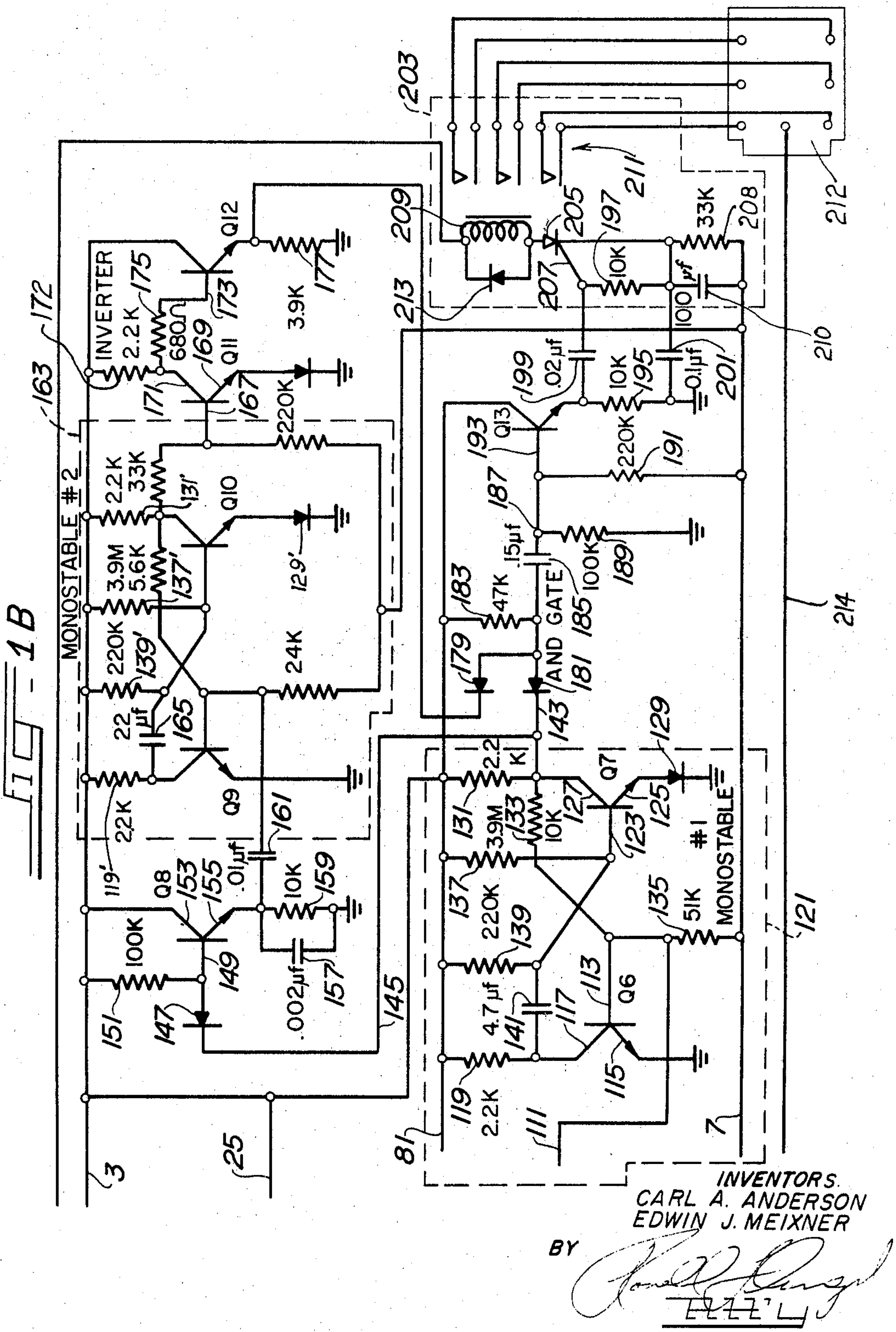

In the particular embodiment shown in the circuit diagram of FIGURES 1A and 1B, a conventional power supply 1 is utilized to provide the necessary DC voltages and currents for the control circuit. A positive DC potential of 13 volts is obtained on line 3, while a negative potential of 13 volts is obtained of line 5. The negative 13 volts appearing on line 5 is fed to the control circuit on lead 7.

An incoming signal for the control circuit is produced on lead 9 by element 11. Element 11 is a conventional transducer (such as a phonograph needle) utilized to convert the sound recorded on a phonograph record (not shown) to an electrical signal, but which is represented only in schematic form in this drawing. The incoming signal passes through a switch arrangement indicated generally as 13 before appearing on lead 15. Switch 13 has a pair of bridging elements **13*a* and 13*b* that are interconnected to move as a unit in a vertical direction (in the FIGURE 1A orientation). In the position shown in FIGURE 1A, the incoming signal is applied to lead 15 through resistor 14 and capacitor 16. If the bridging elements 13*a* and 13*b* are moved to the lowermost position, the incoming signal is connected to lead 15 only through capacitor 16. When bridging elements 13*a* and 13*b* are in an intermediate position, the incoming signal is not conveyed to lead 15**.

The incoming signal passes through a coupling resistor 17 before being applied to base 19 of a transistor amplifier Q1, which also includes emitter 21 and collector 23. A positive collector potential is obtained from line 25 (which connects to line 3) through a collector load resistance 27. Resistors 29 and 31 bias transistor Q1 to respond as a Class A amplifier. A resistor 33 is connected from the emitter 21 of Q1 to ground. When a positive-going large amplitude signal appears on base 19, conduction through transistor Q1 is increased, thereby increasing the current through resistor 27 and decreasing the potential on collector 23 by an amount dependent upon the amplification factor of Q1. The converse occurs if a negative-going large amplitude signal is applied to base 19. Therefore, the output of transistor Q1 is an amplified and inverted form of the input.

After being amplified by transistor Q1, the large amplitude signals are fed to a point 36 through a capacitor 37 and a resistor 39 in series. In a conventional record player the record rotates in the same direction and is traversed by the same needle as each side is played, so that large amplitude signals produced by the needle passing over a groove wall have the same polarity. However, in other types of mechanisms, such as a vertical arrangement, different needles will traverse the two sides, although the record is rotated in the same direction. Thus, it has been found that relatively large amplitude signals produced by the needle crossing over a groove wall on one side of a record have a different polarity than the corresponding signals produced on the other side of the record. Thus, it is necessary to invert signals of one polarity in order to use the same control for both sides of the record. In the ensuing description, the pulse signals have been referred to as "positive" and "negative." It should be realized that while this may refer to absolute polarities, it may also refer only to a change of magnitude in the indicated direction without an absolute change of polarity. This is accomplished by sending the negative relatively large amplitude signals appearing at point 36 through a coupling resistor 41 and a coupling capacitor 43 in series to base 45 of a transistor Q2. Transistor Q2 also includes emitter 47 and collector 49, with a collector bias being obtained from line 25 through a resistor 51. A bias for base 45 of transistor Q2 is obtained from the midpoint of a voltage divider network comprising resistors 53 and 55 connected in series between lines 7 and 25. Transistor Q2 inverts the signals applied to base 45 because of the 180° phase shift obtained from an amplier, i.e., a positive signal applied to base 45 increases conduction through Q2 and increases the voltage drop across resistor 51 to decrease the output signal on collector 49 by an amount proportional to the magnitude of the signal applied to base 45. Application of a negative signal to base 45 produces an exact converse of this series of steps.

Signals appearing on the collector 49 of transistor Q2 are coupled through a capacitor 57 to a detector network comprising a diode 59, a resistor 61, and a capacitor 63. This network causes a negative signal appearing on collector 49 to be shunted to ground through diode 59, thus permitting only positive signals to pass. The detected positive signal is then passed through a resistor 65 and a capacitor 67 in series to base 69 of a transistor Q3. If the relatively large amplitude signals appearing at point 36 were positive in polarity, they would be fed directly to base 69 of transistor Q3 through a resistor 71 and a capacitor 73 in series. Thus, relatively large amplitude signals from either side of the record appear as positive signals on base 69 of transistor Q3. Transistor Q3 includes emitter 75 and collector 77 and is connected in an emitter follower configuration, with emitter 75 connected to ground through a resistor 79. Collector 77 is connected directly to a line 81 (which connects to the positive source of DC potential on line 3). A bias for base 69 of transistor Q3 is obtained from the midpoint of a voltage divider network formed from resistors 83 and 85 connected between lines 7 and 81. Transistor Q3, in combination with transistors Q4 and Q5, provides additional amplification and shaping of the relatively large amplitude signals to produce resultant pulses for use in the succeeding circuitry.

From emitter 75 of transistor Q3, the positive signal (there being no inversion in an emitter follower amplifier) is fed through a resistor 87 to base 89 of transistor Q4. Emitter 91 of transistor Q4 is connected directly to ground, while collector 93 of transistor Q4 is connected to line 81 through a resistor 95. The natural 180° phase shift introduced by transistor Q4 produces a negative signal on collector 93 of transistor Q4.

The negative signal on collector 93 is passed through a resistor 97 to base 99 of transistor Q5. Emitter 101 of transistor Q5 is connected directly to ground, while collector 103 of transistor Q5 is connected to line 81 through a resistor 105. A bias for base 99 of transistor Q5 is obtained from the voltage dividing action of resistors 95, 97, and 107, which are connected in series between lines 7 and 81, with the bias voltage for base 99 being obtained from between resistors 97 and 107. Again the input signal is phase shifted 180° so that the output signal appearing on collector 103 is a pulse having a positive polarity. This positive pulse is then fed through a diode 109 to a lead 111. The circuitry comprising transistors Q1–Q5 and associated elements may be characterized as a detector, amplifier, and shaper network 112, as indicated by the broken outline in FIGURE 1A.

As shown in FIGURE 1B, lead 111 serves to connect the amplified and shaped positive-going pulse to base 113 of a transistor Q6. Transistor Q6 and an associated transistor Q7 form a first monostable multivibrator circuit 121, as follows. Emitter 115 of transistor Q6 is connected directly to ground, while a collector potential for collector 117 is obtained from line 81 through a resistor 119. Transistor Q7 includes base 123, emitter 125, and collector 127. Emitter 125 is connected to ground through a diode 129. Collector 127 is connected to the positive DC supply voltage on line 81 through a resistor 131, and to the negative supply potential on line 7 through resistors 133 and 135 in series. Resistors 131, 133, and 135 form a voltage divider which insures that the voltage on base 113 of transistor Q6 is below ground potential when transistor Q7 is in a conducting state, and that the voltage on collector 127 of transistor Q7 is nearly the same as the positive supply potential when transistor Q7 is in a non-conducting state. The supply potential is also applied directly to base 123 of transistor Q7 through resistors 137 and 139 connected in parallel. A capacitor 141 connects base 123 of transistor Q7 to collector 117 of transistor Q6.

Monostable multivibrator circuit 121 produces an output pulse signal (which in the described embodiment has a time duration of approximately 600 milliseconds) on the collector 127 of transistor Q7. Normally, the supply potential from line 81 applied to base 123 of transistor Q7 through resistors 137 and 139 biases the base-emitter junction in a forward direction, and the small current flow through this junction and resistors 137 and 139 is enough to initiate conduction of transistor Q7. Thus, transistor Q7 is in a normally conducting state, and, when transistor Q7 is conducting, collector 127 thereof is essentially at ground potential, so that conduction from line 7 through resistors 135 and 133 to ground produces a negative potential on base 113 of transistor Q6, thereby maintaining transistor Q6 in a non-conducting state. When transistor Q6 is in a non-conducting state, the potential of collector 117 thereof is essentially that of the supply voltage, but the potential on base 123 of transistor Q7 is somewhat less than the supply potential due to current conduction through resistors 137 and 139. Therefore, capacitor 141 is charged an amount corresponding to the potential difference between the voltage on collector 117 of transistor Q6 and the voltage on base 123 of transistor Q7.

When a positive pulse is applied to base 113 of transistor Q6 through lead 111, transistor Q6 is triggered into a conducting state. Conduction of transistor Q6 causes the potential on collector 117 thereof to approach ground potential. With collector 117 at ground potential, capacitor 141 will attempt to charge in the opposite direction, i.e., by obtaining a current from the base 123 of transistor Q7, which will transfer transistor Q7 to a non-conducting state. When transistor Q7 is in a non-conducting state, the potential on collector 127 thereof will approach that of the positive supply voltage, thus producing a positive output signal of the monostable multivibrator circuit 121. The duration of this positive output pulse signal will depend upon the time constant of the R-C circuit comprising capacitor 141 and resistors 137 and 139 and the characteristics of transistor Q7. Since the resistor 137 is provided with a relatively large value, resistor 139 functions as the effective resistance of the parallel arrangement. Thus, after the initial surge of charging current which shuts off transistor Q7, the charging current for capacitor 141 (obtained through resistors 137 and 139) will rapidly decay exponentially. After a specified time duration (e.g., 600 milliseconds in this embodiment), the charging current required by capacitor 141 will have decreased to the point that the voltage drop across resistors 137 and 139 will no longer bias transistor Q7 to a non-conducting state. At this time transistor Q7 will begin conduction, collector 127 will drop essentially to ground potential and transistor Q6 will be returned to a non-conducting state. As Q6 is returned to a non-conducting state, collector 117 will return essentially to supply potential, which will cause capacitor 141 to discharge. The discharge of capacitor 141 produces an additional current in the base of 123 of transistor Q7, thereby further guaranteeing that transistor Q7 will remain in a conducting state.

The output pulse of monostable multivibrator circuit 1 is then advanced on two parallel paths, indicated by leads 143 and 145 in FIGURE 1B. The pulse on lead 145 back biases a diode 147, the cathode of which is normally connected to ground through transistor Q7. When diode 147 is connected to ground through transistor Q7, it biases a transistor Q8 to a non-conducting state by maintaining base 149 of transistor Q8 at ground potential. When diode 147 is back biased by the output pulse of monostable multivibrator circuit 121, a forward bias is obtained for transistor Q8 through resistor 151. Collector 153 of transistor Q8 is connected directly to the positive voltage supply on line 3, while emitter 155 of transistor Q8 is connected to ground through a parallel circuit comprising a capacitor 157 and a resistor 159 in parallel. The emitter follower configuration in which transistor Q8 is connected provides a high output impedance to isolate succeeding stages of the control circuit from preceding circuitry. A positive output pulse on emitter 155 is passed through a coupling capacitor 161 to a second monostable multivibrator circuit 163.

Monostable multivibrator circuit 163 is essentially the same as monostable multivibrator circuit 121, except that the value of a capacitor 165 provided therein is substantially greater than the capacitance of capacitor 141, and some other circuit parameters have been slightly changed, as indicated in FIGURE 1B. Circuit elements 119, 129, 131, 137 and 139 remain the same and are designated 119, 129, 131, 137 and 139 in monostable multivibrator circuit 121. The larger capacitance of capacitor 165 increases the R-C time constant and, hence, increases the time duration of the pulse output from monostable multivibrator circuit 163. In this particular embodiment, the time duration of the output signal of monostable multivibrator circuit 163 is 4 seconds. Otherwise, circuit 163 functions in the same manner as circuit 121.

The output pulse signal of monostable multivibrator circuit 163 is applied to base 167 of a transistor Q11. Transistor Q11 includes emitter 169 and collector 171 and serves to invert the positive output pulse signal of monostable multivibrator circuit 163. Thus, the illustrative 4 second pulse signal appears across a load resistor 172 of transistor Q11 and has a negative polarity. This negative pulse is then applied to base 173 of an emitter follower transistor Q12 through a resistor 175. Emitter follower transistor Q12 has a load resistor 177 connected to ground and serves primarily as a circuit isolation element.

From the emitter follower transistor Q12, the negative pulse signal is conveyed to the cathode of a diode 179. The plate of diode 179 is connected to the plate of a diode 181. The cathode of diode 181 is supplied with the output signal from monostable multivibrator circuit 121 through line 143. The plates of diodes 179 and 181 are connected to the positive supply potential or line 81 through a resistor 183, and to one side of a capacitor 185, the other side of which is connected to a circuit point 187. Point 187 is connected to ground through a resistor 189 and also is connected to the negative supply potential through a resistor 191.

When transistor Q7 is conducting or transistor Q12 is not conducting, the voltage at the plates of diodes 179 and 181 is essentially ground potential. If a positive pulse (an output signal of monostable multivibrator circuit 121) is applied to the cathode of diode 181, this diode will be back biased and the potential at the plates of the diodes 179 and 181 will rise slightly. However, the cathode of diode 179 is connected to ground through resistor 177, which is relatively small compared to resistor 183, so that current conduction through resistor 183, diode 179, and resistor 177 does not appreciably raise the voltage on the plates of diodes 179 and 181. However, if diode 179 is back biased at the same time that diode 181 is back biased, the current path will be split between resistors 189 and 191. The current flow through resistors 189 and 191 will produce a positive signal which is applied to base 193 of a transistor Q13. Thus, diodes 179 and 181, and the associated circuitry, serve as an AND gate to provide a positive input signal for transistor Q13 only when a positive signal is applied to both of the diodes 179 and 181.

Transistor Q13 is an emitter follower amplifier biased for Class A amplification. Transistor Q13, in its emitter-follower configuration, also serves to isolates the preceding circuitry from succeeding circuits. The output signal of transistor Q13 is formed across a resistor 195, and this output signal is also reproduced across a resistor 197 by the coupling action of capacitors 199 and 201.

Resistor 197 is included in a switching circuit indicated generally by 203. Switching circuit 203 includes a switching element, shown in this embodiment as a silicon controlled rectifier 205. The signal across resistor 197 is applied to gate 207 of silicon controlled rectifier 205. This signal on gate 207 initiates conduction of the silicon controlled rectifier 205 to provide an energizing current for a relay coil 209. Energization of relay coil 209 causes the relay contacts, indicated generally by 211, to be actuated. Relay contacts 211 are connected to corresponding terminals on a panel 212 by appropriate leads. A conventional record reject circuit (not shown) is also connected to the terminals of panel 212. A line 214 is connected from a terminal on panel 212 to base 69 of transistor Q3. Actuation of relay contacts 211 causes the conventional record reject circuit (not shown) to be energized for removing the offending record. A diode 213 is connected across the relay coil 209 to provide a circuit path for dissipating energy stored in the coil during energization of the relay upon cut-off of silicon controlled rectifier 205. This dissipation of the energy stored in coil 209 insures rapid and complete cut-off of silicon controlled rectifier 205. A parallel R-C circuit comprising resistor 208 and capacitor 210 is connected in series with the plate-cathode circuit of silicon controlled rectifier 205.

Figure 2:
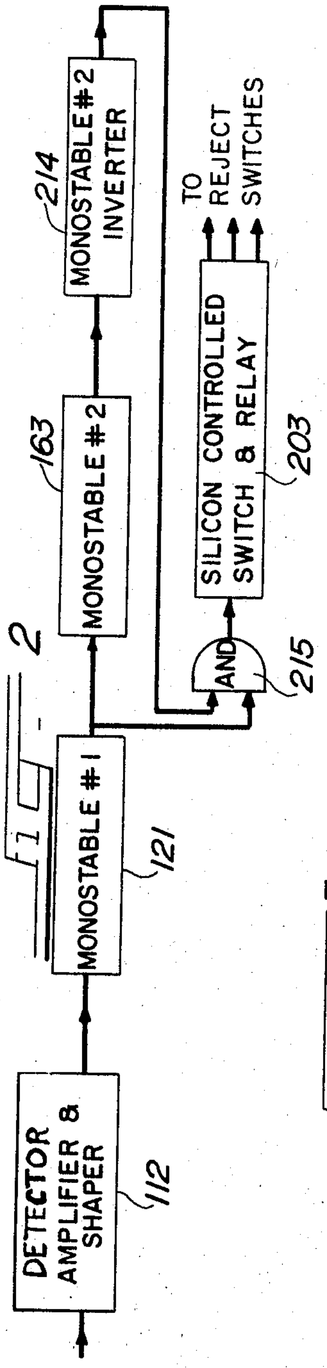
FIGURE 2 is a block diagram of the control circuit of FIGURE 1.
Figure 3:
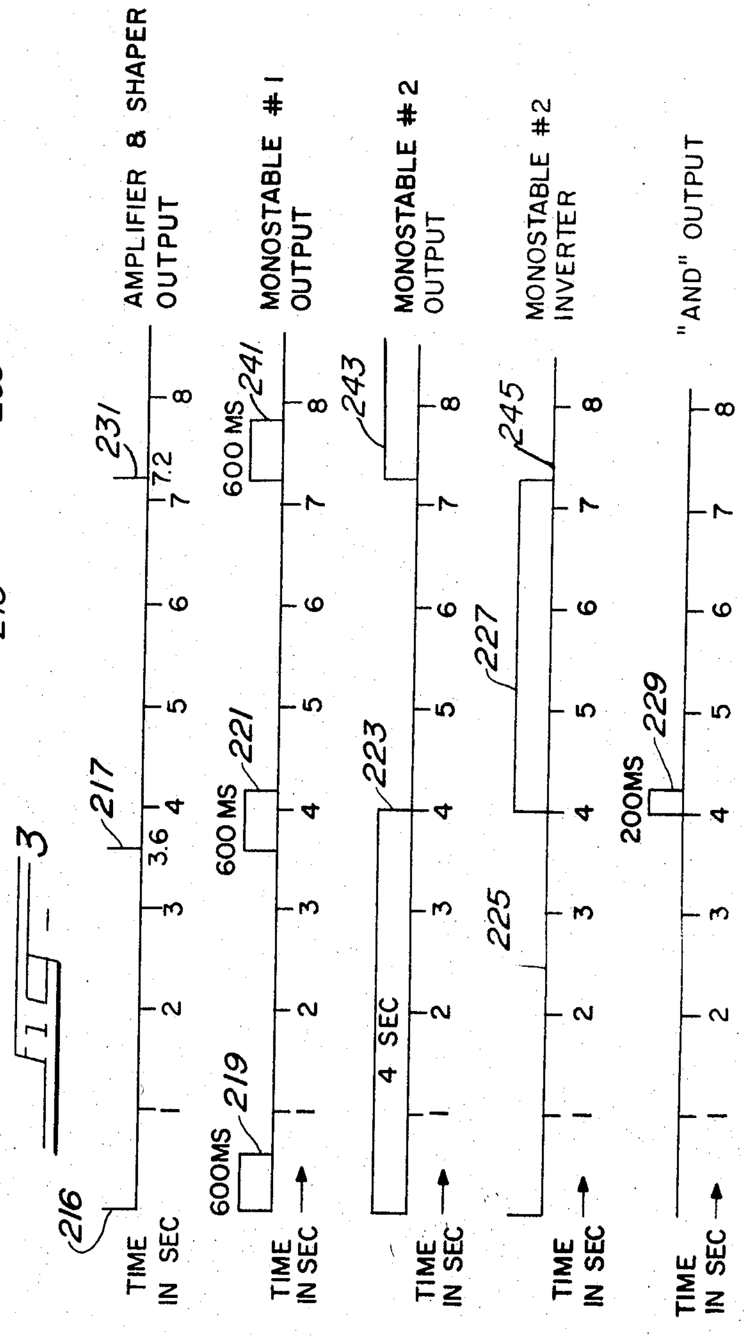
FIGURE 3 is a series of diagrams illustrating the electrical signals occurring at various points in the control circuit shown in the particular embodiment of FIGURE 1 during its operation.

The exact operation of the above-described circuit may be more completely defined by reference to FIGURES 2 and 3. In FIGURE 2 the major elements of the circuit shown in FIGURES 1A and 1B are illustrated in block form. These major elements include the detector, amplifier, and shaper network 112, first monostable multivibrator 121, second monostable multivibrator 163, an inverter 214 comprising transistor Q11, an AND gate 215 comprising diodes 179 and 181 and the associated circuitry, and switching circuit 203.

In FIGURE 3 the signals at various points in the circuit are illustrated as a function of time. If a phonograph needle becomes stuck in one section of a record groove, a relatively large amplitude signal is applied to the input of transistor Q1. After being amplified and shaped by circuit 112, the resultant pulse appears on lead 111. This pulse is shown as a spike 216 at the top of FIGURE 3. After one revolution of the record, which takes 3.6 seconds, a second relatively large amplitude signal will be applied to the circuit and a second spike 217 will appear on lead 111.

Spike 216 is applied to base 113 of transistor Q6 in monostable multivibrator circuit 121. Monostable multivibrator circuit 121 then produces an output pulse signal 219 on collector 127 of transistor Q7. In the described embodiment, pulse 219 has a 600 millisecond duration, which is obtained by appropriate choice of the values for capacitor 141, resistors 137 and 139, and other circuit parameters. Similarly, the presence of a spike pulse 217 from circuit 112 on lead 111 causes a 600 millisecond pulse 221 to appear on collector 127 of transistor Q7. Pulses 219 and 221 are applied to both monostable multivibrator circuit 163 and AND gate 215.

Application of pulse 219 to monostable multivibrator circuit 163 produces essentially the same type of action that occurs in monostable multivibrator circuit 121. However, the capacitor 165 has a greater capacitance than capacitor 141, so that the output pulse of monostable multivibrator circuit 163 has a greater time duration than pulse 219 from monostable multivibrator circuit 121. In this particular embodiment, with the given speed of rotation of the record, the output pulse signal 223 of monostable multivibrator circuit 163 has a time duration of 4 seconds. Since this 4 second time duration of pulse 223 is greater than the 3.6 second time separation between spike pulses 216 and 217, monostable multivibrator circuit 163 will not change states upon the application of pulse 221 to its input. It should be noted that monostable multivibrator circuit 163 will cease producing an output pulse after 4 seconds, even though it is receiving an input pulse from monostable multivibrator circuit 121 at that time, since monostable multivibrator circuit 163 is triggered by the leading edge of the input pulse from monostable multivibrator circuit 121. This is true because capacitor 165 will discharge through transistor Q10, maintaining the collector of Q10 at nearly ground potential, which keeps the current flow through transistor Q9 at a small value. Thus, the collector potential of transistor Q9 is dropped only slightly from the positive supply voltage value, and the discharge of capacitor 165 through transistor Q10 is not interrupted until some time subsequent to the end of pulse 221.

During the time that pulse 223 is applied to the base 167 of transistor Q11, transistor Q11 is biased to a heavily conducting state, so that the output signal of the inverter circuit 214 is essentially at ground potential. This ground potential signal is labeled 225 in FIGURE 3. After the pulse 223 is removed from base 167, the conduction through transistor Q11 will be decreased, and the output of the inverter circuit 214 will appear as a positive pulse 227.

As indicated in FIGURE 3, for a period of 200 milliseconds a positive output results from both inverter circuit 214 (pulse 227) and monostable multivibrator circuit 121 (pulse 221). In physical terms, this means that both diodes 179 and 181 are back biased, so that for this period of 200 milliseconds a positive pulse will appear across resistors 189 and 191. Thus, the output of AND gate 215 is a 200 millisecond pulse 229.

Pulse 229 is applied to gate 207 of silicon controlled rectifier 205 to cause the relay coil 209 to be energized. This results in actuation of relay contacts 211 and the consequent rejection of the record on which a continuous repetition of one section of the groove is occurring.

Figures 4, 5:
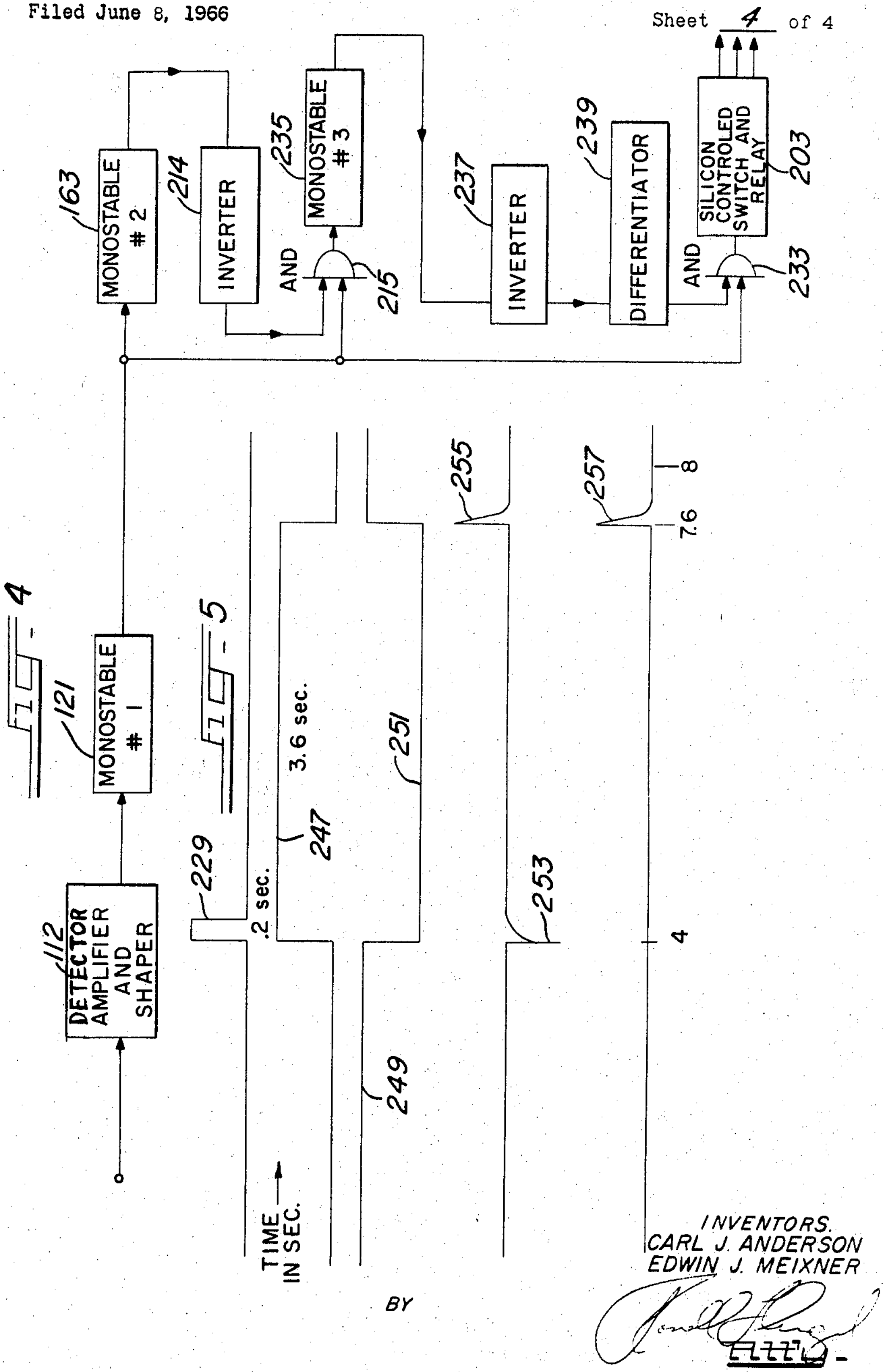
FIGURE 4 is a block diagram of another embodiment of the counter circuit of this invention.
FIGURE 5 is a series of diagrams illustrating the electrical signals occurring at various points in the control circuit shown in FIGURE 4.

Another embodiment of the subject invention is shown in block diagram form in FIGURE 4. Since the major portion of this embodiment is identical to that shown in FIGURES 1 and 2, and since the additional elements are conventional circuits, a detailed circuit diagram for this embodiment has not been included. Due to the identity of the major part of the two embodiments, identical circuit elements have been given the same identifying numerals in FIGURES 2 and 4 (which also applies to FIGURES 3 and 5 wherein the identical pulse 229 has been so labeled).

The embodiment shown in FIGURE 4 includes a detector, amplifier, and shaper circuit 112, which amplifies and shapes the relatively large amplitude signals occasioned by a phonograph needle passing over the side of a groove to form spike pulses such as 216, 217, and 231 in FIGURE 3. Output pulses from circuit 112 are passed to a first monostable multivibrator circuit 121 that produces an output pulse having a time duration of 600 milliseconds. The output signal of monostable multivibrator circuit 121 is applied to a second monostable multivibrator circuit 163, which produces an output pulse having a time duration of 4 seconds; to a first AND gate 215; and to a second AND gate 233 (see FIGURE 4). As the output pulse of monostable multivibrator circuit 163 is produced, it is inverted by an inverting circuit 214 and applied to AND gate 215. When the output of monostable multivibrator circuit 121 and the inverted output of monostable multivibrator circuit 163 are both positive, AND gate 215 produces an output pulse which is applied to a third monostable multivibrator circuit 235. Monostable multivibrator circuit 235 is essentially identical to monostable multivibrator circuits 121 and 163, except that the output pulse which it is designed to produce has a time duration of 3.6 seconds. The output of monostable multivibrator circuit 235 is inverted by a conventional inverting circuit 237, which is essentially the same as inverter circuit 214. The inverted output of monostable multivibrator circuit 235 is then fed to a conventional differentiator circuit 239. From differentiator circuit 239, the inverted output of monostable multivibrator circuit 235 is passed to second AND gate 233. When the output of monostable multivibrator circuit 121 and the inverted and differentiated output of third monostable multivibrator circuit 235 are both positive, an output signal will be produced by AND gate 233. The output of AND gate 233 is then passed to a switching circuit 203, described in connection with the FIGURE 1 embodiment, which causes the actuation of proper contacts to initiate rejection of the record.

By reference to FIGURES 3 and 5, the operation of this particular embodiment may be more completely described. Since the electrical signals illustrated in FIGURE 3 for the FIGURE 2 embodiment are exactly the same for the FIGURE 4 embodiment, they have not been reproduced in FIGURE 5, except for the output of AND gate 215 which provides a reference for the rest of FIGURE 5. It should be noted that the chart of FIGURE 5 has not been drawn to a true time scale, but merely indicates the relative times at which the signals depicted occur. Referring now to FIGURE 3, it will be recalled that a spike pulse 216 appearing at the output of amplifier and shaper circuit 112 energizes monostable multivibrator circuit 121 to produce an output pulse 219 having a time duration of 600 milliseconds. Similarly, spike pulses 217 and 231 cause monostable multivibrator circuit 121 to produce 600 millisecond output pulses 221 and 241. Also as previously described, the output of monostable multivibrator circuit 121 causes monostable multivibrator circuit 163 to produce an output pulse 223 having a time duration of 4 seconds. Since monostable multivibrator circuit 163 is already producing an output when pulse 221 is formed, there is no change of state of monostable multivibrator circuit 163. However, the occurrence of pulse 241 at the output of monostable multivibrator 121 causes monostable multivibrator circuit 163 to produce an output pulse 243. The inverting action of inverter 214 results in the production of an output 225 for the duration of pulse 223, the production of a pulse 227 during the time period between pulses 223 and 243, and the production of an output labeled 245 in FIGURE 3 for the duration of pulse 243. During the 200 milliseconds that both pulse 221 and pulse 227 appear at the inputs to AND gate 215, a pulse 229 is derived at the output of AND gate 215.

Moving to FIGURE 5, it may be seen that pulse 229 is shown at the same time location as illustrated in FIGURE 3. Application of pulse 229 to monostable multivibrator circuit 235 causes monostable multivibrator circuit 235 to produce an output pulse 247 having a time duration of 3.6 seconds. It will be noted that the 3.6 second output of monostable multivibrator circuit 235 is achieved by proper adjustments of the parameters of that circuit, just as monostable multivibrator circuit 121 is set for a 600 millisecond output and monostable multivibrator circuit 163 is set for a 4 second output. Output pulse 247 of monostable multivibrator circuit 235 is applied to inverter circuit 237, which causes inverter 237 to switch from producing an output 249 to producing an output 251. The output of inverter 237 is connected to differentiator 239, which produces a negative-going pulse 253 when the inverter 237 switches from output 249 to output 251, and an output pulse 255 when the inverter 237 returns to producing its original output after a 3.6 second time lapse.

Since spike 231 has produced an output 241 from monostable multivibrator circuit 121 at 7.2 seconds after the introduction of spike pulse 216, the 600 millisecond pulse 241 will be present when pulse 255 is formed at 7.6 seconds after the introduction of spike 216. It should be noted that since the occurrence of pulse 241 produced pulse 243 at the output of monostable multivibrator circuit 163, which was inverted to produce an output 245 for inverter 214, no additional pulse was passed to monostable multivibrator circuit 235. This is true because output 245 is not a positive pulse as is required for operation of AND gate 215. Since positive pulse 241 appears at the input of AND gate 233 at the same time that positive pulse 255 is formed at the input to AND gate 233, an output pulse 257 is obtained from AND gate 233.

Output pulse 257 is then applied to circuit 203 to cause the reject switches to be actuated to have the record rejected from the turntable. In the manner described three relatively large amplitude pulses occasioned by a phonograph needle passing over the wall of a record groove are counted in order to cause the undesirable record to be rejected.

Again it should be noted that the two embodiments described herein both produce a relatively non-complex, accurate record rejecting arrangement. However, the two count embodiment (i.e., responsive to two "pops") has the advantage of being smaller and less expensive. On the other hand, the three count embodiment (i.e., responsive to three "pops") has the advantage of giving greater assurance that the record will not be accidentally rejected.

It should be understood that the embodiment described is merely exemplary of the preferred practice of the present invention and that various changes, modifications, and variations may be made in the arrangements, details of construction, and operations of the elements disclosed herein, without departing from the spirit and scope of the present invention, as defined in the appended claims.

What is claimed is:

1. A record reject system of the character described and adapted for use in association with a phonograph in which a phonograph needle may pass over a wall separating two sections of a groove of a record being rotated for play comprising:

detection means for detecting relatively large amplitude signals that may result from the phonograph needle passing over the wall of the groove of the record being played;

timing means responsive to said detection means for determining if at least two of said relatively large amplitude signals occur in sequence at a time separation corresponding to the time of one revolution of the record; and switching means operatively connected to said timing means and activated only upon the occurrence of at least two of said relatively large amplitude signals in sequence at said time separation to cause the record being played to be rejected.

2. A system as claimed in claim 1 wherein said timing means comprises:

a first monostable multivibrator circuit connected to receive a signal from said detection means and producing an output signal;

a second monostable multivibrator circuit connected to receive a signal from said detection means and producing an output signal; and a first sensing circuit connected to receive said output signals of said monostable multivibrator circuits and to determine if two of said relatively large amplitude signals occur in sequence at said time separation.

3. A system as claimed in claim 2 and further comprising a first inverter circuit connected between said second monostable multivibrator circuit and said first sensing circuit.

4. A system as claimed in claim 3 wherein:

circuit elements of said first monostable multivibrator circuit are chosen to produce an output signal having a relatively short time duration with respect to said time separation, said output signal of said first monostable multivibrator circuit serving as an input signal for said second monostable multivibrator circuit; and circuit elements of said second monostable multivibrator circuit are chosen to produce an output signal having a time duration greater than said time separation by a time interval shorter than the time duration of said output signal of said first monotsable multivibrator circuit, whereby the inverted output signal of said second monostable multivibrator circuit and said output signal of said first monostable multivibrator circuit have the same polarity for a short time after the occurrence of the second of two large amplitude signals having a time separation corresponding to the time of one revolution of the record.

5. A system as claimed in claim 3 wherein said first sensing circuit comprises:

a first diode having a plate and a cathode and normally biased to a conducting state, said cathode being connected to the output of said first monostable multivibrator circuit; and a second diode having a plate and a cathode and normally biased to a conducting state, said cathode being connected to said first inverter circuit, and said plate being connected to the plate of said first diode and to said switching means, whereby the occurrence of two of said relatively large amplitude pulse signals at said time separation will result in both of said diodes being biased to a nonconducting state to produce a control signal for said switching means.

6. A system as claimed in claim 1 wherein said detection means comprises a transistor amplifier biased in such a manner so as to operate only upon the introduction of a relatively large amplitude signal.

7. A system as claimed in claim 1 wherein said switching means comprises a silicon controlled rectifier connected in series with the coil of a relay.

8. A system as claimed in claim 2 and further comprising:

a third monostable multivibrator circuit connected to receive a signal from said first sensing circuit and producing an output signal; and a second sensing circuit connected to receive said output signals of said first and third monostable multivibrator circuits to determine if three of said relatively large amplitude signals occur in sequence at said time separation.

9. A system as claimed in claim 8 and further comprising:

a second inverter circuit; and a differentiator circuit connected in series with said second inverter circuit between said third monostable multivibrator circuit and said second sensing circuit.

References Cited

UNITED STATES PATENTS 2,921,992 1/1960 Bick ............ 179—100.4

BERNARD KONICK, *Primary Examiner.*

RAYMOND F. CARDILLO, Jr., *Assistant Examiner.*